UNITED STATES PATENT OFFICE.

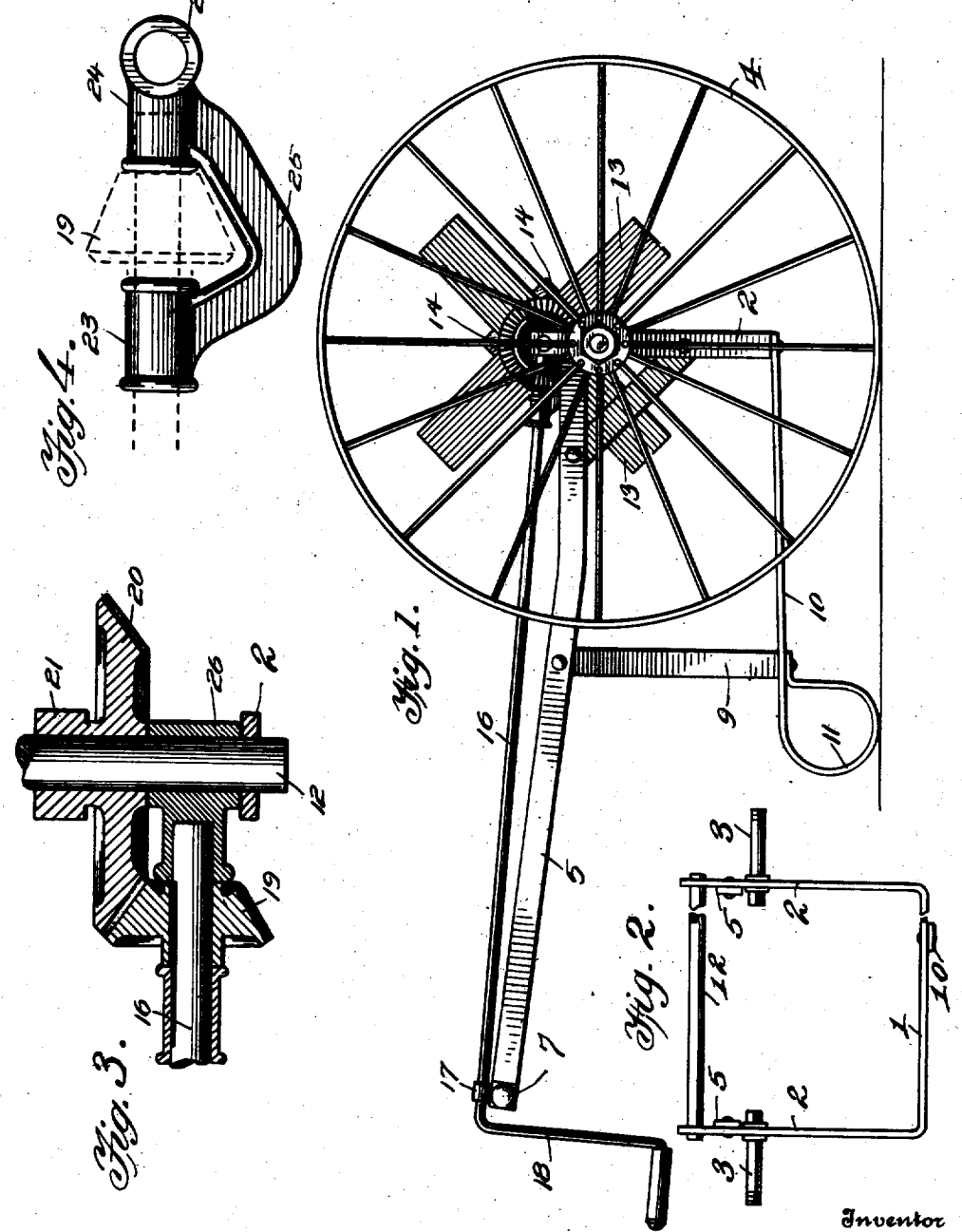

WILLIAM P. KASSULKER, OF NEW GERMANY, MINNESOTA.

REEL FOR BARB-WIRE.

974,070. Specification of Letters Patent. Patented Oct. 25, 1910.

Application filed August 17, 1909. Serial No. 513,237.

*To all whom it may concern:*

Be it known that I, WILLIAM P. KASSULKER, a citizen of the United States, residing at New Germany, in the county of Carver and State of Minnesota, have invented new and useful Improvements in Reels for Barb-Wire, of which the following is a specification.

This invention relates to reels for barb wire and the like, the object of the invention being to provide a truck supported reel especially designed for the needs of farmers and adapted to be made of wire or like material to readily wind upon the main body while the truck is being moved in a field or held stationary as may be found expedient.

One of the main objects of the invention is to provide an exceedingly compact and convenient form of reel of the class referred to which may be manufactured cheaply and sold at a cost which would place the same within the reach of every farmer.

To the above end the invention consists in the novel construction, combination and arrangement of parts herein fully described, illustrated and claimed.

In the accompanying drawings:—Figure 1 is a side elevation of a reel embodying the present invention. Fig. 2 is a rear elevation of the drop frame of the machine. Fig. 3 is an enlarged detail horizontal section through the gearing. Fig. 4 is a side elevation of the bearing yoke.

Referring to the drawings it will be seen that the machine comprises a drop frame embodying a bottom bar 1 and upstanding side bars 2 arranged substantially parallel to each other and formed integrally with the bottom bar 1, the said side bars having rigidly secured thereto outwardly extending axle spindles 3 upon which the carrying wheels 4 are mounted.

Above the axle spindles 3, the drop frame has connected thereto the rear ends of the side bars 5 of a horizontal frame by means of which the truck as a whole is moved from place to place. At their forward ends the side bars 5 are connected by a handle bar which extends across and connects the bars 5 and projects beyond the same to form the lateral handles 7. A cross bar not shown connects the side bars 5 at an intermediate point.

Extending downward from the side bars 5 is a U-shaped brace 9 and connected with the bottom bar of said brace is a longitudinal brace 10 the rear end of which is connected centrally to the bottom bar 1 of the drop frame. The brace 10 is continued in advance of the member 9 and bent over into substantially circular shape to form a rest 11 for the truck when standing still.

The side bars 2 of the drop frame are extended above the side bars 5 to receive the shaft 12 of the reel. This reel comprises a pair of oppositely arranged heads 13 which are shown for convenience as cruciform frames the arms of which are connected by bars 14.

The means for imparting motion to the reel will now be described.

16 designates the reel operating shaft which extends lengthwise above the frame composed of the side bars 5 and the handle bar 6. This operating shaft 16 is mounted with bearings 17 secured to the handle bar 6 and is provided in front of said handle bar with an operating crank 18. On the rear end of the shaft 16 there is mounted a bevel pinion 19 which meshes with a bevel gear wheel 20. The wheel 20 is provided with a hub 21 to which is secured a spider 22 the extremities of which are connected to the adjacent head 13 of the reel body as shown in Fig. 2. The shaft 16 is journaled in bearings 23 and 24 arranged at opposite sides of the pinion 19 and connected by an angle yoke 25, the distance between the bearings 23 and 24 being just sufficient to receive and admit of the rotation of the pinion 19 as clearly illustrated in Fig. 4. In addition to the bearings 23 and 24, the yoke 25 also supports a bearing 26 which receives the extended end of the reel shaft 12 as shown in Fig. 3 thus maintaining the gear wheels 19 and 20 in perfect registry and mesh with one another. The gears 19 and 20 are so proportioned as to give the necessary power to wind the barb wire on the reel and drag a very considerable length of wire along the field without the necessity of wheeling the truck in the wheel simultaneously with the winding of the wire thereon.

The frame of the machine hereinabove described is exceedingly simple and economical in manufacture is well braced, and the reel operating mechanism is also of a simple character and not liable to get out of order. One of the principal advantages of the construction resides in the employment of the drop frame whereby the device as a whole is rendered exceedingly compact and the center of the rotation of the reel is brought close up to the axis of the truck wheels thus avoiding the necessity of arranging the reel at a higher elevation above the axle of the truck or in front or in rear thereof as has heretofore been necessary.

I claim:—

In a reel of the class described, a drop frame embodying a bottom bar and upstanding spaced side bars, wheel-supporting spindles carried by the said side bars and located near the upper ends thereof, a reel revolubly supported on said drop frame, a horizontal frame extending rearwardly of the said drop frame and having side bars connected at their forward ends with the side bars of the said drop frame, a handle bar connecting the rear ends of the said side bars of the said horizontal frame, a depending frame secured to the said horizontal frame and located directly at the rear of the said drop frame, and a longitudinal brace member secured at its forward end to the bottom bar of the drop frame and secured near its rear end to the said depending frame and having its terminal bent to form a supporting foot.

In testimony whereof I affix my signature in presence of two witnesses.

WILLIAM P. KASSULKER.

Witnesses:
A. J. SCHNOHICH,
HENRY D. MELKE.